(12) United States Patent
Fulghum

(10) Patent No.: US 8,009,722 B2
(45) Date of Patent: Aug. 30, 2011

(54) MULTI-PASS PARAMETER ESTIMATION FOR G-RAKE RECEIVER

(75) Inventor: Tracy L. Fulghum, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 788 days.

(21) Appl. No.: 11/954,460

(22) Filed: Dec. 12, 2007

(65) Prior Publication Data

US 2009/0154531 A1 Jun. 18, 2009

(51) Int. Cl.
H04B 1/00 (2006.01)

(52) U.S. Cl. ........ 375/148; 370/319; 370/330; 370/335; 370/342; 370/345; 333/150; 333/151; 333/193; 333/194; 333/195

(58) Field of Classification Search ........................ None
See application file for complete search history.

(56) References Cited

U.S. PATENT DOCUMENTS

| 6,580,772 | B2 | 6/2003 | Pajukoski | |
|---|---|---|---|---|
| 6,865,218 | B1 | 3/2005 | Sourour | |
| 7,035,284 | B2 | 4/2006 | Willenegger et al. | |
| 7,082,174 | B1 | 7/2006 | Smee et al. | |
| 7,170,924 | B2 | 1/2007 | Corbaton et al. | |
| 7,209,511 | B2 | 4/2007 | Dent | |
| 2003/0016740 | A1* | 1/2003 | Jeske et al. ..................... | 375/227 |
| 2004/0033791 | A1 | 2/2004 | Schmidl et al. | |
| 2004/0161057 | A1 | 8/2004 | Malladi et al. | |
| 2005/0069023 | A1 | 3/2005 | Bottomley et al. | |
| 2005/0141598 | A1* | 6/2005 | Akita ........................... | 375/148 |
| 2005/0201447 | A1 | 9/2005 | Cairns et al. | |
| 2006/0007990 | A1 | 1/2006 | Cozzo et al. | |
| 2006/0056496 | A1 | 3/2006 | Smee et al. | |
| 2006/0067383 | A1 | 3/2006 | Cozzo et al. | |
| 2006/0072485 | A1 | 4/2006 | Cairns et al. | |
| 2007/0047628 | A1 | 3/2007 | Fulghum et al. | |
| 2007/0147481 | A1 | 6/2007 | Bottomley et al. | |
| 2008/0002759 | A1* | 1/2008 | Cairns et al. ................... | 375/148 |
| 2008/0291887 | A1* | 11/2008 | Cairns ........................... | 370/342 |
| 2009/0052584 | A1* | 2/2009 | Cairns ........................... | 375/340 |
| 2010/0027590 | A1* | 2/2010 | Alebachew et al. ........... | 375/148 |
| 2010/0254436 | A1* | 10/2010 | Larsson ........................ | 375/148 |

OTHER PUBLICATIONS

Bottomley, Gregory E. and Cozzo, Carmela, "Coherent Rake Reception Using Noisy Channel Estimates," Vehicular Technology Conference, 2004. VTC2004-Fall 2004 IEEE 60th vol. 3, Date Sep. 26-29, 2004, pp. 1801-1805.

Fulghum, Tracy; Cairns, Douglas; Bottomley, Gregory E.; Cozzo, Carmela, "Low Complexity Parameter Estimation for the Multi-antenna Generalized Rake Receiver," Vehicular Technology Conference, 2006. VTC 2006-Spring. IEEE 63rd vol. 4, 2006, pp. 1874-1878.

(Continued)

*Primary Examiner* — Shuwang Liu
*Assistant Examiner* — Gina McKie
(74) *Attorney, Agent, or Firm* — Coats & Bennett, P.L.L.C.

(57) ABSTRACT

In a parametric G-Rake receiver, a method an apparatus computes initial estimates of one or more scaling parameters and initial combining weights for the parametric G-Rake receiver; estimates the SINR of a received signal based on a mean pilot symbol estimate and the initial combining weights; computes revised estimates for one or more scaling parameters based on the estimated SINR and the initial combining weights; and computes revised combining weights based on one or more revised scaling parameter estimates.

16 Claims, 3 Drawing Sheets

OTHER PUBLICATIONS

Li, Qinghua; Georghiades, Costas N.; Wang, Xiaodong, "Joint Sequential Channel Estimation and Multiuser Detection for Uplink CDMA over Multipath Fading," Vehicular Technology Conference 2002. Proceedings. VTC 2002-Fall 2002 IEEE 56th vol. 3, 2002, pp. 1882-1886.

Xiaofei, Zhang; Dazhuan, Xu; Bei, Yang, "A Novel Adaptive Channel Estimation Method in WCDMA System Based on Weighed Least Squares," Signal Processing 2004. Proceedings. ICSP '04. 2004 7th International Conference, vol. 2, Aug. 31-Sep. 4, 2004, pp. 1699-1702. Digital Object Identifier 10.1109/ICOSP.2004.1441661.

Dietrich, Frank A., Utschick, Wolfgang, "Pilot-Assisted Channel Estimation Based on Second-Order Statistics," IEEE Transactions on Signal Processing, vol. 53, No. 3, Mar. 2005, pp. 1178-1193.

Kuo, Wen-Yi, "Improved Rake Receiver Using Finger Variance Weight," IEEE International Conference, vol. 4, 2001, pp. 1163-1167.

Kong, Ning; Riphagen, Ian; Lotter, Michiel, "A Simple and New Optimum Combining Scheme for CDMA Down Link Signals," Wireless Communications and Networking, 2003, 2003 IEEE, vol. 1, Mar. 16-20, 2003, pp. 520-524.

Brunner, Christopher; Haardt, Martin; Nossek, Josef A., "Adaptive Space-Frequency Rake Receives for WCDMA," 1999 IEEE International Conference. vol. 4, Mar. 15-19, 1999, pp. 2383-2386.

Sadler, David J.; Manikas, Athanassios, "MMSE Multiuser Detection for Array Multicarrier DS-CDMA in Fading Channels," IEEE Transactions on Signal Processing, vol. 53, No. 7, Jul. 2005, pp. 2348-2358.

Hochwald, Bertrand M.; Marzetta, Thomas L., "Adapting a Downlink Array from Uplink Measurements," IEEE Transactions on Signal Processing, vol. 49, No. 3, Mar. 2001, pp. 642-653.

* cited by examiner

MULTI-PASS PARAMETER ESTIMATION FOR G-RAKE RECEIVER

BACKGROUND

The present invention relates generally to G-Rake receivers, and more particularly to the estimation of combining weights for a G-Rake receiver.

Conventional Rake receivers for Code Division Multiple Access (CDMA) systems exploit multipath reception for improved signal-to-noise ratios. In operation, each of two or more Rake fingers obtains despread values from a received CDMA signal by correlating the received signal against a known spreading sequence. By aligning the processing delay of each Rake finger with a different path delay of the multipath signal, the Rake receiver effectively obtains a different copy of the desired signal for each Rake finger. Maximum ratio combining of the despread values from each Rake finger yields, at least in theory, a combined signal having an improved signal-to-noise ratio as compared to the signal from any one Rake finger.

The "standard" Rake receiver works well in white noise environments, where the signal impairments are uncorrelated across the Rake fingers. Standard Rake receiver performance becomes sub-optimum in colored noise environments, where at least some components of the overall received signal impairments may be strongly correlated across the Rake fingers. In other words, the standard Rake receiver does not perform well in terms of suppressing colored interference, where the received signal impairments across Rake fingers may exhibit significant correlations.

The "Generalized Rake" (G-Rake) receiver was developed to better suppress interference by taking into account impairment correlations across Rake fingers. The basic operation of a G-Rake receiver is described in Bottomley, et al., Generalized Rake Reception for Cancelling Interference from Multiple Base Stations," IEEE Vehicular Technology Conference (2000) and U.S. Pat. No. 6,363,104 B1 to Bottomley et al. The best interference suppression is achieved if up-to-date covariance information (the "instantaneous color" of the impairment) is used when determining the combining weights. U.S. Pat. No. 6,714,585 B1 to Wang et al. describes a method for computing G-Rake combining weights based on received signal impairment correlations.

Rather than directly calculating received signal impairment correlations, it is known to represent received signal impairments according to a parametric model that is dynamically "fitted" to ongoing observations of impairment, which may be short-term, somewhat "noisy" snapshots of received signal impairment. In parametric G-Rake receivers, an overall received signal covariance matrix is constructed based on available channel information and is expressed as the combination of various constituent components of the impairment. The relative weights (fitting parameters) of these components are determined dynamically, such as by fitting the model terms to ongoing impairment correlation measurements. U.S. Published Application No. 2005/0201447 A1 to Cairns et al. describes an exemplary parametric G-Rake receiver.

One problem with the parametric G-Rake receiver is the estimation of the scaling parameters. In parametric G-Rake receivers, the performance of the receiver in terms of interference suppression depends on the accuracy of the fitting parameters. The introduction of higher-order modulation and multiple-input, multiple-output in Release 7 of the WCDMA standard will increase the signal-to-interference ratio (SINR) at the receiver and will make parameter estimation less reliable. Therefore, there is considerable interest in finding and developing new techniques for obtaining reliable estimates of scaling parameters in a parametric G-Rake receiver.

SUMMARY

The present invention provides a method and apparatus for computing combining weights in a parametric G-Rake receiver. A G-Rake processor computes initial estimates of one or more scaling parameters and initial combining weights for G-Rake combining. The G-Rake processor separately estimates the SINR of a received signal based on a mean pilot symbol estimate and the initial combining weights. Revised estimates for one or more scaling parameters are then computed by the G-Rake processor based on the estimated SINR and the initial combining weight estimates. The revised scaling parameter estimates are used to compute revised combining weights for G-Rake combining.

DETAILED DESCRIPTION

Figure 1:
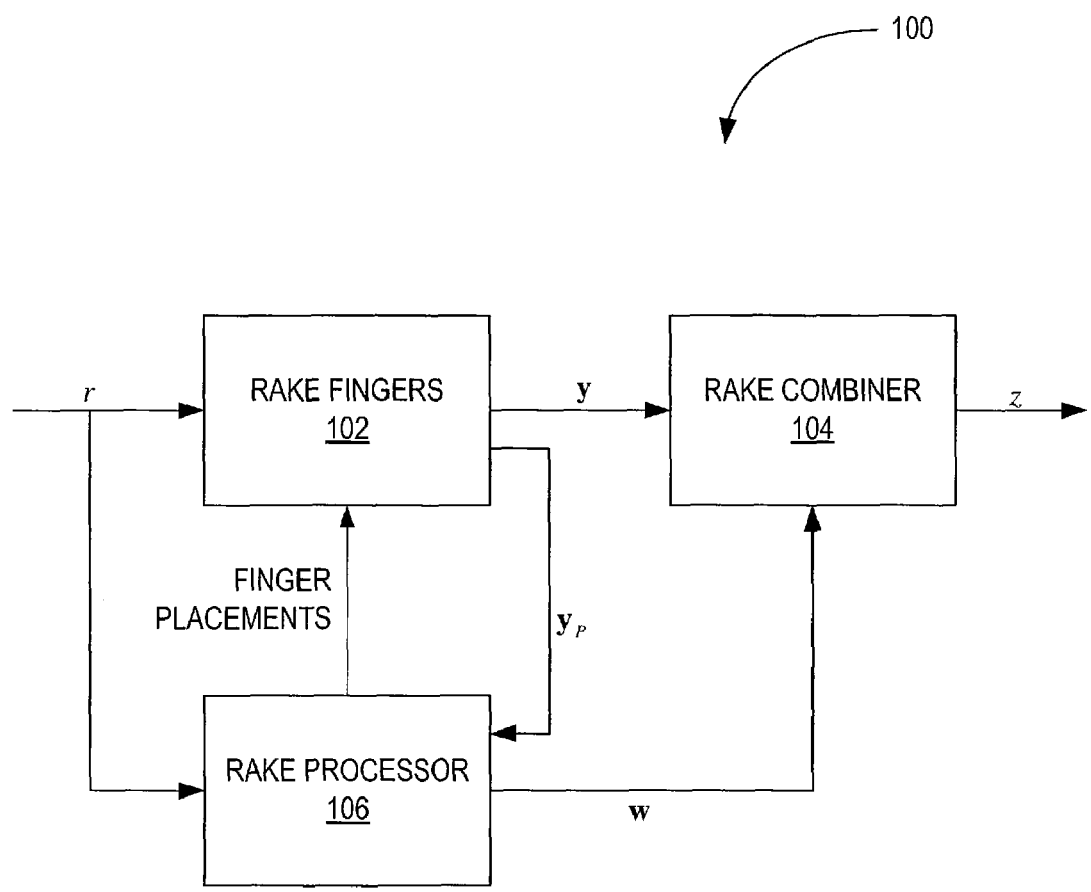
FIG. 1 illustrates an exemplary parametric G-Rake receiver.

Referring now to the drawings, FIG. 1 illustrates an exemplary G-Rake receiver 100 for a Code Division Multiple Access (CDMA) system. The G-Rake receiver 100 comprises a plurality of G-Rake fingers 102, a G-Rake combiner 104, and a G-Rake processor 106. The G-Rake fingers 102 despread a received signal r to generate despread values at each finger for a symbol of interest, represented in vector form as y. Similarly, despread values are produced for pilot symbols represented in vector form as $y_p$. The G-Rake combiner 104 combines the despread values y from the G-Rake fingers 102 to generate a G-Rake combined value z. G-Rake processor 106 determine finger delays for the G-Rake fingers 102 and computes a combining weight vector w used by the G-Rake combiner 104 to combine the despread symbol values y. In computing the combining weight vector w, the G-Rake processor 106 takes the impairment correlations across the G-Rake fingers 102 into account to reduce interference in the G-Rake combined values z.

In one exemplary embodiment, G-Rake processor 106 uses a parametric model of the impairment covariance to compute the G-Rake combining weight vector w. An impairment covariance matrix R is modeled as a weighted sum of an interference covariance matrix $R_i$ and a noise covariance matrix $R_n$ as shown below:

$$R = \alpha R_i + \beta R_n. \quad \text{Eq. (1)}$$

In the above model, $\alpha$ is a scaling parameter for a modeled interference covariance matrix $R_i$, and $\beta$ is a scaling parameter for a modeled thermal noise covariance matrix $R_n$. The combining weight vector w for a G-Rake receiver 100 may be computed according to:

$$w = R^{-1} h, \quad \text{Eq. (2)}$$

where h is the channel response vector corresponding to the pilot channel. Substituting the parametric model given by Eq. 1 into Eq. 2 then gives:

$$w = (\alpha R_i + \beta R_n)^{-1} h. \quad \text{Eq. (3)}$$

The interference covariance matrix $R_i$ and noise covariance matrix $R_n$ may be calculated based on knowledge of the channel delays, channel coefficients, pulse shape, and finger placement as known in the art. The scaling parameters $\alpha$ and $\beta$ may be estimated by measuring the impairment covariance R on the common pilot channel and adjusting the scaling parameters $\alpha$ and $\beta$ to fit the parametric model given by Eq. 1 to the measured impairment covariance R. A least squares (LS) fitting process may be used to estimate the scaling parameters as described in Bottomley.

One problem with the parametric approach is the determination of the scaling parameters $\alpha$ and $\beta$. The use of higher order modulation and multi-input multiple-output (MIMO) in Release 7 of the WCDMA standard has increased the required signal-to-interference ratios (SINRs) of WCDMA receivers. The G-Rake receiver 100 improves the estimation of the scaling parameters by using a separate measure of the SINR to refine the initial estimates of the scaling parameters $\alpha$ and $\beta$ to obtain revised estimates.

Conventionally, the SINR in a parametric G-Rake receiver, denoted herein by $\hat{\gamma}$, is computed according to:

$$\hat{\gamma} = \frac{|w^H h|^2}{w^H(\alpha R_i + \beta R_n)w}. \qquad \text{Eq. (4)}$$

To improve the estimation of the scaling parameters $\alpha$ and $\beta$, the G-Rake processor 106 exploits the fact that the scaling parameters $\alpha$ and $\beta$ may be expressed as a function of $\hat{\gamma}$. Solving Eq. (4) for $\beta$ yields:

$$\beta = \frac{1}{w^H R_n w}\left(\frac{|w^H h|^2}{\hat{\gamma}} - \alpha w^H R_i w\right). \qquad \text{Eq. (5)}$$

By obtaining a separate estimate of the SINR, the G-Rake processor 106 may compute a revised estimate of $\beta$ from Eq. 5. The same process may be used to express $\alpha$ as a function of $\hat{\gamma}$ and to obtain a revised estimate of $\alpha$.

One possible measurement of the SINR may be obtained based on the mean pilot symbol $\bar{s}$ received over the common pilot channel. More specifically, the Rake processor 106 may calculate the mean pilot symbol power and the noise power of the mean pilot symbol. From these power estimates, the Rake processor 106 may compute an estimate of the SINR. One estimate of the mean pilot symbol $\bar{s}$ is given by:

$$\bar{s} = \frac{1}{N}\sum_{k=1}^{N} w_0^H y_k, \qquad \text{Eq. (6)}$$

where $y_k$ is a vector of despread values from the G-Rake combiner 104 associated with the $k^{th}$ pilot symbol and $w_0$ represents a conventional solution of the combining weights for a G-Rake receiver 100. The noise power, denoted $\hat{\sigma}_n^2$, may be estimated as the variance of the mean pilot symbol, which is given by:

$$\hat{\sigma}_n^2 = \frac{1}{N-1}\sum_{k=1}^{N} |\bar{s} - w_0^H y_k|^2. \qquad \text{Eq. (7)}$$

The signal power of the mean pilot symbol is calculated as the square of the mean pilot symbol $|\bar{s}|^2$. The SINR $\hat{\gamma}$ may then be computed from the mean pilot symbol power and the noise power according to:

$$\hat{\gamma} = \frac{|\bar{s}|^2 - \frac{1}{N}\hat{\sigma}_n^2}{\hat{\sigma}_n^2}. \qquad \text{Eq. (8)}$$

It may be noted that a small portion of the noise estimate $\sigma_n^2$ may be subtracted from the mean pilot symbol power $|\bar{s}|^2$ to remove any bias from noise power in the estimate of the pilot symbol power.

Figure 2:
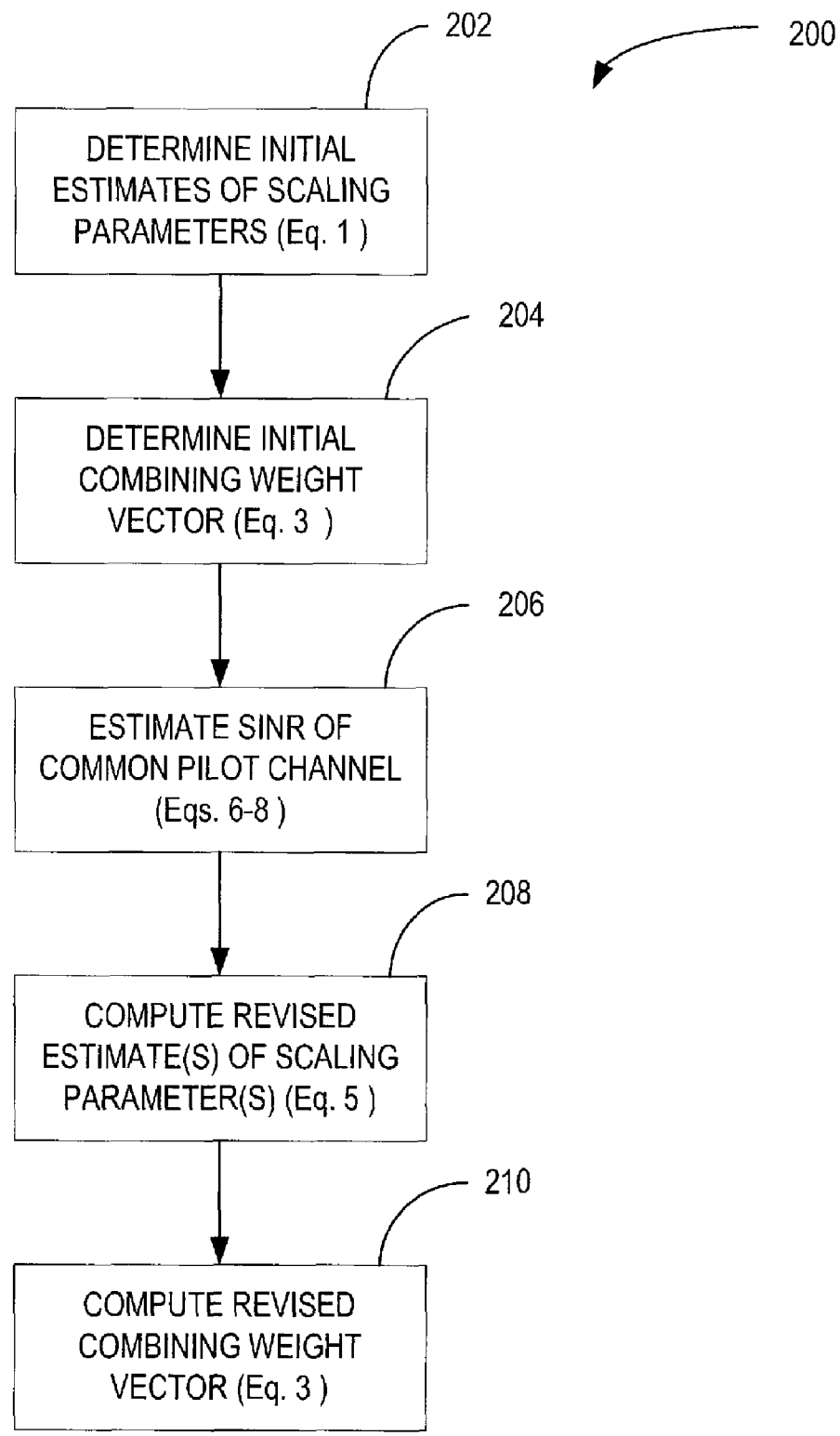
FIG. 2 illustrates an exemplary method for computing combining weights for a parametric G-Rake receiver.

FIG. 2 illustrates an exemplary method for computing G-Rake combining weights. Initial estimates $\hat{\alpha}_0$ and $\hat{\beta}_0$ of the scaling parameters $\alpha$ and $\beta$ based on the impairment covariance R on the common pilot channel (block 202). The initial estimates $\hat{\alpha}_0$ and $\hat{\beta}_0$ are then used to compute initial G-Rake combining weights $w_0$ (block 204). Next, a separate estimate $\hat{\gamma}$ of the SINR is obtained (block 206) that includes information not used in the computation of the initial combining weights vector $w_0$. For example, an independent estimate $\hat{\gamma}$ of SINR may be the measured SINR on the pilot channel. A revised estimate $\hat{\beta}_1$ of the scaling parameter $\beta$ is then computed based on the measured SINR $\hat{\gamma}$ and the initial G-Rake combining weight vector $w_0$ (block 208). As an example, a revised estimate $\hat{\beta}_1$ may be computed according to Eq. 5 based on the measured SINR $\hat{\gamma}$, the initial estimate $\hat{\alpha}_0$, and the initial combining weight vector $w_0$. Similarly, a revised estimate $\hat{\alpha}_1$ of $\alpha$ may be computed based on the measured SINR $\hat{\gamma}$, the initial estimate $\hat{\beta}_0$ or revised estimate $\hat{\beta}_1$ of $\beta$, and the initial combining weight vector $w_0$. When the revised estimates $\hat{\alpha}_1$ and $\hat{\beta}_1$ of the scaling parameters $\alpha$ and $\beta$ are obtained, revised G-Rake combining weights $w_2$ may be recomputed according to Eq. 3 (block 210).

Figure 3:
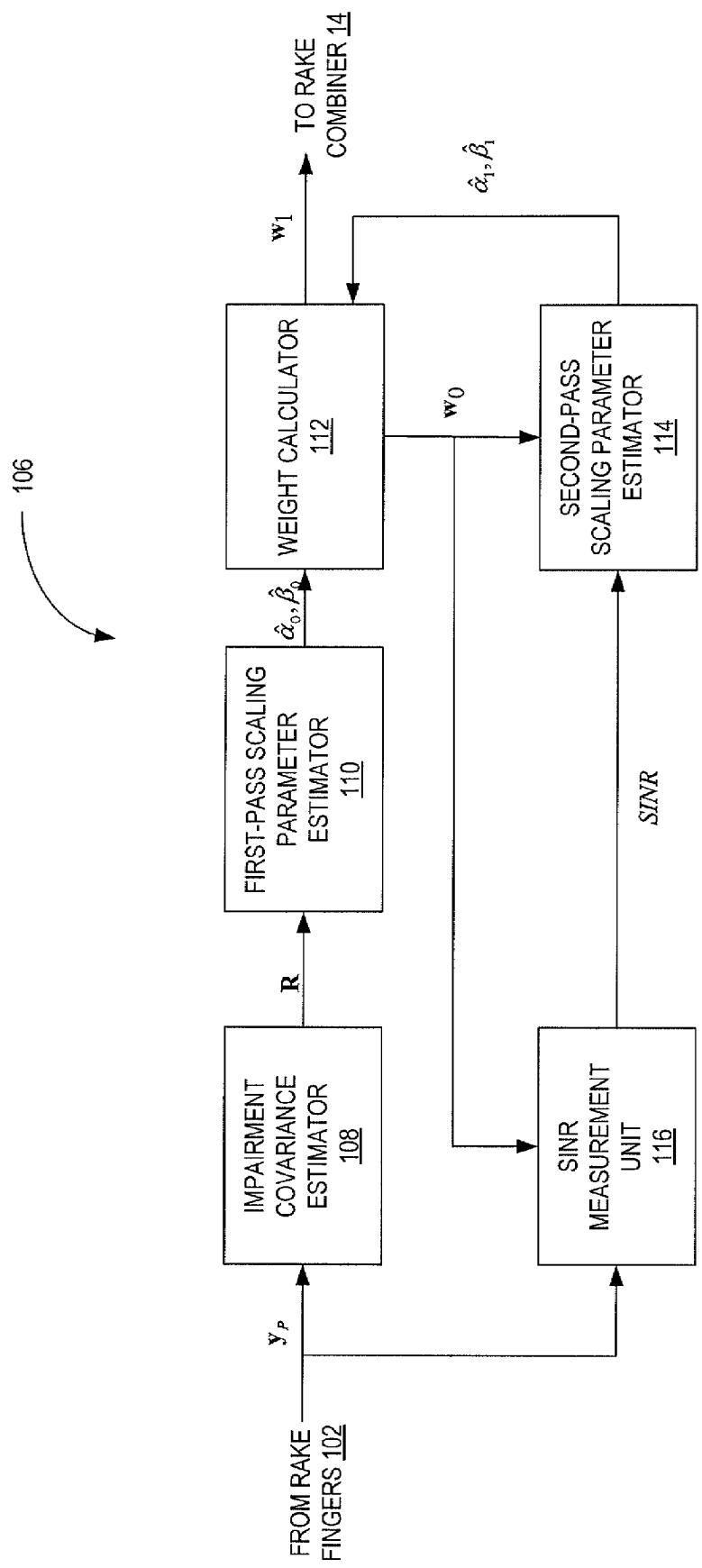
FIG. 3 illustrates an exemplary G-Rake processor for computing combining weights for a parametric G-Rake receiver.

FIG. 3 illustrates one exemplary embodiment of the G-Rake processor 106. G-Rake processor 106 comprises an impairment covariance estimator 108, first pass scaling parameter estimator 110, combining weight calculator 112, second pass scaling parameter estimator 114, and SINR estimator 116. The impairment covariance estimator 108 estimates the impairment covariance from the common pilot symbol. The impairment covariance estimate is applied to the first pass scaling parameter estimator 110. The first pass scaling parameter estimator 110 generates initial estimates $\hat{\alpha}_0$ and $\hat{\beta}_0$ of scaling parameters $\alpha$ and $\beta$. The initial estimates $\hat{\alpha}_0$ and $\hat{\beta}_0$ may be computed by a least squares fitting process to fit the parametric model of the interference to the measured impairment covariance according to Eq. 1. The initial estimates $\hat{\alpha}_0$ and $\hat{\beta}_0$ are applied to a combining weight calculator 112. The combining weight calculator 112 generates initial G-Rake combining weight vector $w_0$ according to Eq. 3. The initial combining weight vector $w_0$ is applied to a second pass scaling parameter estimator 114. The second pass scaling parameter estimator 114 computes revised estimates $\hat{\alpha}_1$ and $\hat{\beta}_1$ of one or more of the scaling parameters. In the exemplary embodiment described herein, the second pass scaling parameter estimator 114 computes a revised estimate $\hat{\beta}_1$ of $\beta$ according to Eq. 5. Those skilled in the art will appreciate that the second pass scaling parameter estimator 116 may also compute a revised estimate $\hat{\alpha}_1$ of $\alpha$ in a similar fashion. The SINR estimator 116 provides an estimate $\hat{\gamma}$ of the SINR to the second pass scaling parameter estimator 114 to use in computing the revised scaling parameter estimates $\hat{\alpha}_1$ and $\hat{\beta}_1$. The revised scaling parameter estimates $\hat{\alpha}_1$ and $\hat{\beta}_1$ are fed back to the combining weight calculator 112 to generate the final combining weight vector $w_1$.

Using an independent estimate $\hat{\gamma}$ of the SINR to generate revised (2 d pass) estimates $\hat{\alpha}_1$, $\hat{\beta}_1$ of the scaling parameters $\alpha$ and $\beta$ may significantly improve the final G-Rake combining weights, resulting in better interference suppression during Rake combining and better error rate performance.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating combining weights for a parametric G-Rake receiver, said method comprising:
   computing initial estimates of one or more scaling parameters and initial combining weights for the parametric G-Rake receiver;
   estimating an SINR of a received signal based on a mean pilot symbol estimate and the initial combining weights;
   computing revised estimates for the one or more scaling parameters based on the estimated SINR and the initial combining weights; and
   computing revised combining weights based on the one or more of revised scaling parameter estimates.

2. The method of claim 1 wherein estimating the SINR of the received signal comprises determining a mean pilot symbol power and a noise power, and computing the SINR based on the mean pilot symbol power and the noise power.

3. The method of claim 2 wherein the noise power is computed from a variance of the mean pilot symbol estimate.

4. The method of claim 2 wherein computing the SINR based on the mean pilot symbol power and the noise power includes compensating the mean pilot symbol power for bias attributable to the noise power.

5. The method of claim 1 wherein the computing initial estimates of one or more scaling parameters and the initial combining weights for the parametric G-Rake receiver comprises computing initial estimates for a first scaling parameter used to scale a parametric model of interference and a second scaling parameter used to scale a parametric model of noise.

6. The method of claim 5 wherein computing the revised estimates for the one or more scaling parameters comprises computing revised estimates for the second scaling parameter.

7. The method of claim 5 wherein computing the revised estimates for the one or more scaling parameters comprises computing revised estimates for the first and second scaling parameters.

8. The method of claim 1 wherein computing the revised estimates for one or more scaling parameters comprises computing the revised estimates of the scaling parameters as a function of the initial combining weights and the estimated SINR.

9. A G-Rake processor to compute combining weights for Rake combining, said G-Rake processor comprising:
   a first scaling parameter estimator to generate initial estimates of one or more scaling parameters;
   a first combining weight calculator to compute G-Rake initial combining weights based on the initial estimates of said scaling parameters;
   an SINR estimator to generate an SINR estimate of a received signal based on a mean pilot symbol estimate and the initial combining weights;
   a second scaling parameter estimator to generate revised estimates for the one or more scaling parameters based on said SINR estimate; and
   a second combining weight calculator to compute revised G-Rake combining weights based on the one or more of revised estimates of said one or more scaling parameters.

10. The G-Rake processor of claim 9 wherein the SINR estimator is configured to estimate the SINR of the received signal by determining a mean pilot symbol power and a noise power, and computing the estimated SINR based on the mean pilot symbol power and the noise power.

11. The G-Rake processor of claim 10 wherein the SINR estimator is configured to compute the noise power from a variance of the mean pilot symbol.

12. The G-Rake processor of claim 10 wherein the SINR estimator is configured to compensate the mean pilot symbol power for bias attributable to the noise power.

13. The G-Rake processor of claim 9 wherein the first scaling parameter estimator is configured to compute initial estimates for a first scaling parameter used to scale a parametric model of the interference and a second scaling parameter used to scale a parametric model of the noise.

14. The G-Rake processor of claim 13 wherein the second scaling parameter estimator is configured to compute a revised estimate for at least the second scaling parameter.

15. The G-Rake processor of claim 13 wherein the second scaling parameter estimator is configured to compute the revised estimates for the first and second scaling parameters.

16. The G-Rake processor of claim 9 wherein the second scaling parameter estimator is configured to compute the revised estimates of one or more scaling parameters as a function of the initial combining weights and the SINR estimate.

* * * * *

UNITED STATES PATENT AND TRADEMARK OFFICE
CERTIFICATE OF CORRECTION

| | | |
|---|---|---|
| PATENT NO. | : 8,009,722 B2 | |
| APPLICATION NO. | : 11/954460 | |
| DATED | : August 30, 2011 | |
| INVENTOR(S) | : Fulghum | |

It is certified that error appears in the above-identified patent and that said Letters Patent is hereby corrected as shown below:

On the Title Page, in Field (57), under "ABSTRACT", in Column 2, Line 1, delete "method an" and insert -- method and --, therefor.

Signed and Sealed this
Third Day of January, 2012

David J. Kappos
*Director of the United States Patent and Trademark Office*